July 13, 1926.

P. H. MACNEIL

AIRCRAFT

Filed July 31, 1925    2 Sheets-Sheet 1

1,592,740

Paul H. Macneil
INVENTOR

BY Victor J. Evans
ATTORNEY

July 13, 1926.
P. H. MACNEIL
AIRCRAFT
Filed July 31, 1925   2 Sheets-Sheet 2
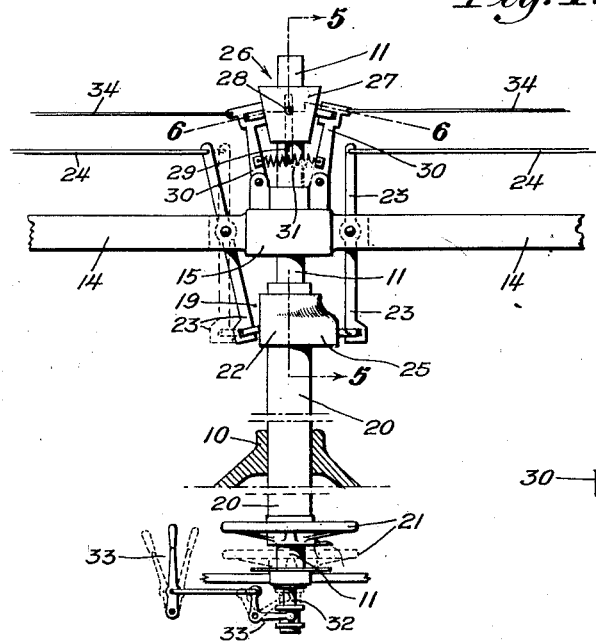
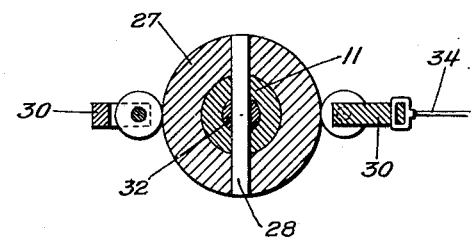
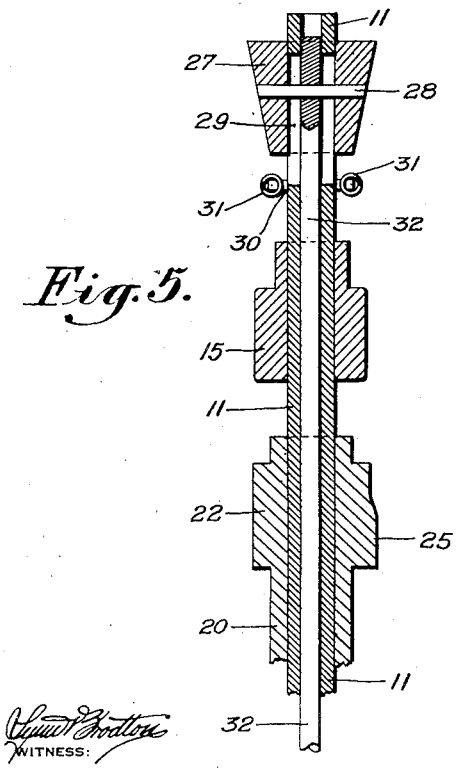
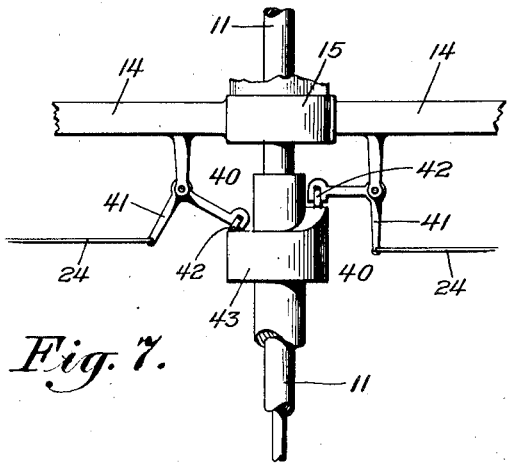
Paul H. Macneil
INVENTOR
BY Victor J. Evans
ATTORNEY Patented July 13, 1926.

1,592,740

UNITED STATES PATENT OFFICE.

PAUL H. MACNEIL, OF NEW YORK, N. Y.

AIRCRAFT.

Application filed July 31, 1925. Serial No. 47,387.

This invention relates to improvements in air craft and more particularly to air craft for vertical as well as horizontal flight.

The primary object of the invention resides in a machine which is capable of rising from or alighting upon the ground in a vertical direction and which may be propelled horizontally or at an angle when in flight.

Another object is to provide an air craft in which is embodied a pair of wings mounted for rotation on opposite sides of a common axis, and each wing having its own propelling means carried in synchronism whereby to stably support the machine when in the air.

With these and other objects in view, the invention residess in certain novel construction and combination and arrangement of parts, the essential features of which are hereinafter fully described, are particularly pointed out in the appended claims, and are illustrated in the accompanying drawing, in which:—

Figure 4 is an enlarged detail elevational view of the aileron and throttle control.

Figure 1:
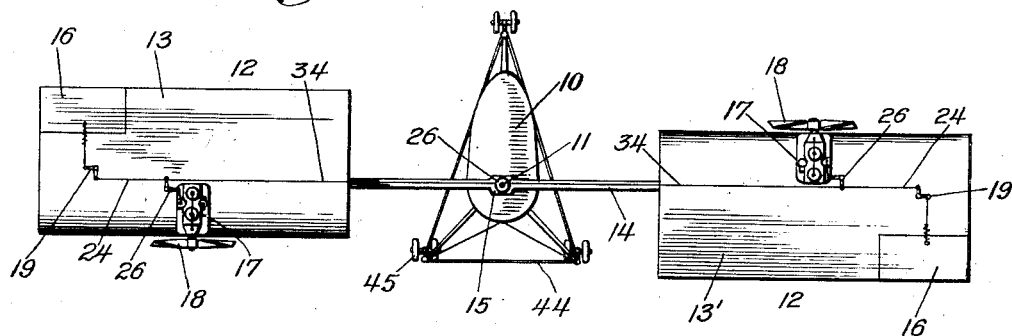
Figure 1 is a top plan view of my improved air craft.
Figure 2:
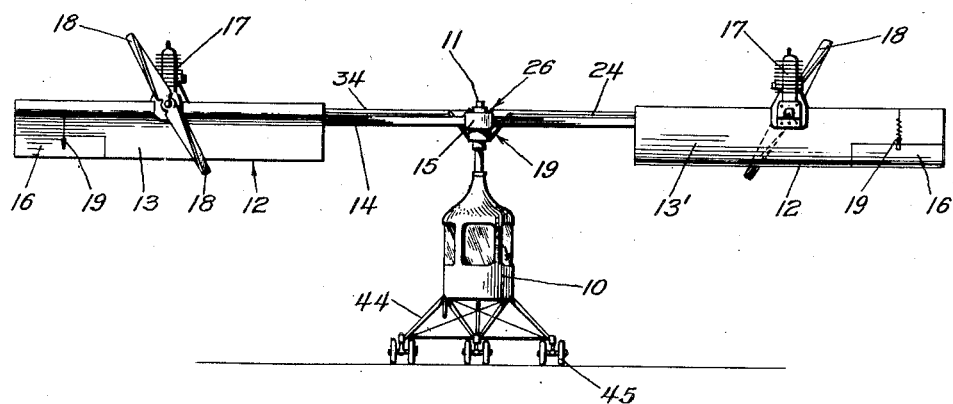
Figure 2 is a front elevation of the same.
Figure 3:
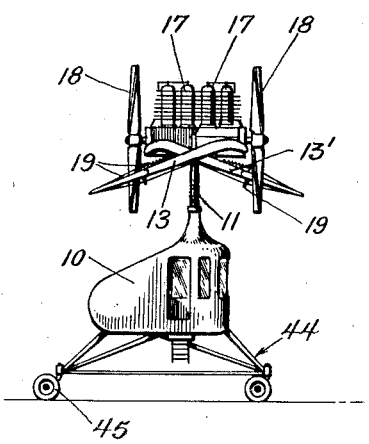
Figure 3 is an end elevation.

Figure 5 is a vertical sectional view on the line 5—5 of Figure 4.

Figure 6 is a horizontal sectional view on the line 6—6 of Figure 4.

Figure 7 is a detail elevational view of a modified form of aileron control.

Referring more particularly to the drawings, the reference numeral 10 designates the car or fuselage of my improved air craft, and from the top of which rises a main vertical supporting shaft 11, disposed in vertical alignment with the center of gravity of the machine. Supported by the shaft 11 is a unit 12 which includes wings 13 and 13' which are connected by a cross arm 14 having a hub 15 through which the shaft 11 extends. The hub may be provided with roller bearings to reduce the friction between the shaft and the unit. Wings 13 and 13' are identical in construction and are disposed on opposite sides of the axis of the shaft 11 and the angle of one is fixed with respect to the angle of the other and with respect to the shaft 11. Briefly, the unit comprises a pair of ordinary aeroplanes rigidly fixed to the ends of an arm rotatably supported in a horizontal plane. Each wing is self contained with power and propeller equipments, aileron, etc., but lacks the usual fuselage, tail and rudder. As hereinbefore mentioned the wings 13 and 13' are identical in construction and a description of one will suffice for the other.

Each wing 13 and 13' is provided in its rear outer corner with an aileron 16 and mounted on the top of the wing forward thereof and approximately midway between the ends of the wing is a motor 17 for driving a propeller 18. The propellers 18 of the wings 13 and 13' are adapted to be driven at the same rate of speed so that an equal force is maintained on opposite sides of the axis of rotation of the unit to balance the machine while in flight.

From the foregoing description, it will be seen that when in operation, gyroscopic action is imparted to the machine in which greater stability is provided than in the case of the usual aeroplane inasmuch as the angles of the wings are fixed to obtain a maximum efficiency, and head resistance is reduced by reason of the elimination of a fuselage for each plane. From the parts already described, the machine when in motion will rise vertically for flight and descend in a vertical direction when landing, being controlled by the speed of the motors and which control means will now be described.

Having described the means for rising vertically into the air, I shall explain the aileron control means 19 which is operable for causing the machine to travel in a horizontal or angular direction. The means 19 comprises a tubular shaft or sleeve 20 which is slidable and rotatable over the main supporting shaft 11 by a manually controlled operating means 21 adapted to be positioned within the car 10 and within reach of the operator. Fixed to the top of the sleeve is a cam 22 adapted to engage one end of rocker arms 23 pivoted to the cross arm 14 and mounted respectively on opposite sides of the axial center of the cross arm.

Wires or cables 24 lead from the other ends of the rocker arms to the respective ailerons 16. The cam 22 is provided with an annular portion 25, and when this portion of the cam is moved in engagement with the lower ends of the rocker arms, both ailerons 16 are in neutral position in alignment with the cross sectional area of the wings. However, when it is desired to operate the ailerons, the control means 21 is operated to move the cam surface into the path of the revolving ends of the rocker arms and when in such position will be operated at an interval on each revolution to cause a pull upon the cables, causing the respective ailerons to be moved which in turn causes the machine to travel in a particular direction. The direction of horizontal travel depends upon the radial position of the cam with respect to the axial center of the sleeve.

For the successful operation of the machine, it is necessary that both the motors 17 be simultaneously controlled and which control means is shown broadly as at 26. The means 26 includes a conical shaped collar 27 slidable over the upper end of the main supporting shaft 11 and rotatable therewith by reason of a pin 28 carried by the collar and which extends through a slot 29 in the shaft. The ends of the slot co-act with the pin for limiting the sliding movement of the collar in opposite directions. Arms 30 are pivoted to the hub of the unit and have their free ends provided with rollers held in engagement with the sides of the collar by a spring 31. A rod 32 extends through the tubular shaft 10 and has one end connected with the pin 28. A manually controlled means 33 is connected with the other end of the rod for imparting vertical sliding movement thereto. The cables 34 have one end connected to the arms 30 and their other ends connected with the throttle of the respective motors 17. It will therefore be seen that when the throttles are in a closed position, the arms are in engagement with the top of the collar, but as the collar is moved in a vertical direction by the control means 33, the spring 31 will tend to cause a pull to be exerted on the cable 34 thus opening the throttles simultaneously. The fuel to the motors is simultaneously controlled in order that the motors are operated at the same rate of speed to impart a like number of revolutions to the propellers.

The numeral 44 designates the landing gear which is supported from beneath the car or fuselage 10 and which includes sets of rollers 45 turnable to rotate in any horizontal direction. Although one type of landing gear has been shown any suitable construction may be provided to permit the machine to "take off" and "land."

Although I have shown an air craft embodying a single unit, it will be readily appreciated that the same principles may be embodied in a biplane, triplane or other multiple plane machine.

In Figure 7 of the drawings, I have shown a slightly modified form of aileron control means 40. In this form of means I employ bell-crank levers 41 pivotally supported by the cross arm, and one leg of which supports rollers 42 which rides over the top of a slidable and rotatable cam 43. The means for operating the cam 43 is identical to that shown in the preferred form. In this form of cam, it will be seen that when the rollers pass over the high point of the cam, the levers will be rocked causing a pull to be exerted on the cables leading to the ailerons.

Although I have shown the motors mounted on the respective wings, it will be appreciated that the same may be mounted on the cross arms if desired, so long as they are equidistantly spaced on opposite sides of the axis of the rotation of the unit. Also, the two motors may be connected together in order to assure synchronism of the same by suitable gearing or by sprockets and chains.

What is claimed as new is:—

1. In an aircraft, a unit including a set of opposed wings disposed on opposite sides of a common axis, the angle of said wings being fixed with respect to each other, propelling means for each wing set for rotating the wings in the same direction, ailerons embodied in said wings, and means automatically operable on each revolution of the unit for respectively operating said ailerons.

2. In an aircraft, a unit including a set of opposed wings disposed on opposite sides of a common axis, the angle of said wings being fixed with respect to each other, propelling means for each wing set for rotating the wings in the same direction, ailerons embodied in said wings, means automatically operable on each revolution of the unit for respectively operating said ailerons, and a means for simultaneously controlling the speed of said propelling means.

3. In an aircraft, the combination of a set of wings fixedly connected together and mounted for rotation on a common axis midway between the same, propelling means for each wing set, a single means for simultaneously controlling the operation of said propelling means, ailerons embodied in said wings, and automatic means for respectively operating said ailerons on each revolution of said wings.

4. An aircraft including a unit embodying a pair of spaced wings fixedly connected with a cross arm, ailerons embodied in said wings, a fuselage, a supporting shaft rising from said fuselage for rotatably supporting said wings, individual propelling means carried by said unit, a common means for controlling the operation of said propelling means, and means automatically operable on each revolution of the unit for respectively operating said ailerons.

5. An aircraft including a unit embodying a pair of spaced wings fixedly connected with a cross arm, a fuselage, a supporting shaft rising from said fuselage for rotatably supporting said wings, individual propelling means carried by said unit, a common means for controlling the operation of said propelling means, said means including a cone-shaped collar slidable over said supporting shaft, and rock arms carried by said cross arm and held in constant engagement with said roller.

6. An airchaft including a unit embodying a pair of spaced wings fixedly connected with a cross arm, a fuselage, a supporting shaft rising from said fuselage for rotatably supporting said wings, individual propelling means carried by said unit, and a common means for controlling the operation of said propelling means, said means including a cone-shaped collar slidable over said supporting shaft, rock arms carried by said cross arm and held in constant engagement with said roller, ailerons carried by said wings, and means for operating said ailerons at an interval during each revolution of said wings.

7. An aircraft including a unit embodying a pair of spaced wings fixedly connected with a cross arm, a fuselage, a supporting shaft rising from said fuselage for rotatably supporting said wings, individual propelling means carried by said unit, a common means for controlling the operation of said propelling means, ailerons carried by said wings, and means for operating said ailerons at an interval during each revolution of said wings, said last means including rock arms carried by said cross arm, and a slidable and rotatable cam engaging said rock arms.

In testimony whereof I have affixed my signature.

PAUL H. MACNEIL.